(12) United States Patent
Teguri et al.

(10) Patent No.: US 8,064,155 B2
(45) Date of Patent: Nov. 22, 2011

(54) STORAGE APPARATUS

(75) Inventors: Hironori Teguri, Kawasaki (JP); Motomichi Shibano, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 460 days.

(21) Appl. No.: 12/407,394

(22) Filed: Mar. 19, 2009

(65) Prior Publication Data

US 2009/0244779 A1 Oct. 1, 2009

(30) Foreign Application Priority Data

Mar. 25, 2008 (JP) ................. 2008-078643

(51) Int. Cl.
*G11B 15/18* (2006.01)
(52) U.S. Cl. ............. 360/71; 360/77.05; 360/97.02
(58) Field of Classification Search ............ 360/77.05, 360/97.03, 98.01
See application file for complete search history.

(56) References Cited

U.S. PATENT DOCUMENTS

| 6,055,139 | A * | 4/2000 | Ohtsuka et al. ............. 360/131 |
| 7,688,542 | B2 * | 3/2010 | Chan et al. .................. 360/77.05 |
| 2010/0020432 | A1 * | 1/2010 | Moribe et al. ................ 360/71 |

FOREIGN PATENT DOCUMENTS

JP 2006-066006 3/2006

* cited by examiner

*Primary Examiner* — Tan T. Nguyen
(74) *Attorney, Agent, or Firm* — Staas & Halsey LLP

(57) ABSTRACT

A storage apparatus includes a magnetic storage medium which is formed with a data portion based on isolated magnetic dots and a servo pattern portion, a drive mechanism which drives the storage medium, a head actuator which includes a head for reading and writing data from and to the storage medium, and a permanent magnet which is disposed at a position that is opposable to a whole radial region of the servo pattern portion, during a rotation of the storage medium.

17 Claims, 8 Drawing Sheets

STORAGE APPARATUS

CROSS-REFERENCE TO RELATED APPLICATIONS

This application is based upon and claims the benefit of priority from the prior Japanese Patent Application No. 2008-78643 filed on Mar. 25, 2008, the entire contents of which are incorporated herein by reference.

BACKGROUND

1. Field

The embodiment(s) discussed herein are related to storage apparatus including a magnetic storage medium having a structure where recording tracks are divided by providing grooves or nonmagnetic regions in a data recording surface, or a magnetic storage medium formed with isolated magnetic dots in a user data portion.

2. Description of the Related Art

In recent years, as techniques for enlarging a recording capacity by enhancing the areal recording density of a magnetic storage medium in a hard disk drive, there have been a perpendicular magnetic recording technique where the storage medium is magnetized in the depth direction thereof, and a medium technique where predetermined concave and convex patterns are formed in the perpendicular magnetic storage medium and where data signals and servo signals (signals which are used for a head to trace tracks) are recorded in the convex patterns. The perpendicular magnetic storage medium to which the prepatterned medium technique is applied, is called a "discrete track medium (DTM)".

The DTM has the regions of nonmagnetic parts between recording tracks to reduce the interferences between the tracks. Further, it is expected to introduce a recording technique which employs a medium called a "bit patterned medium (BPM)" where the tracks in the DTM is divided by nonmagnetic parts so as to form isolated magnetic dots in a track direction on the disk medium and where the magnetic dots are used as information units (bits).

It is considered that the servo patterns of the magnetic disk apparatus employing such a BPM technique are formed in terms of the presence or absence of magnetic regions by working a magnetic recording layer (magnetic region). In this case, the magnetization state of the servo pattern portion is usually such that the direction of the magnetization is either an upward toward the front surface side of the medium or a downward contrary thereto. Besides, in the servo pattern portion, the pattern is made long in order to ensure servo signal quality. Therefore, the area (volume) of a magnetic material pattern in the servo pattern portion is considerably larger as compared with the area (volume) of the dot serving as the information unit in a data portion.

In the servo pattern portion, therefore, the influence of magnetostatic interactions becomes intense, and the deterioration of the signal attributed to a thermal fluctuation is more liable to occur than in the user data portion. In addition, once the servo signal is recorded in the magnetic material pattern of the servo pattern portion, it is not recorded again. As a result, the magnetization state of the magnetic material pattern of the servo pattern portion becomes unstable against heat, and poses a problem in that the track positioning precision of the magnetic head worsens. Regarding this problem, it is proposed in Japanese Laid-Open Patent Publication No. 2006-66006 that a servo pattern is re-magnetized after detecting the lowering of the reproduced output of the servo signal.

However, a state where the lowering of the servo signal has occurred in the detection of the reproduced output, is a state where the positioning precision of the head to the track has been deteriorated, that is, a state where the positioning precision of the head to a region for the re-magnetization has been deteriorated. When the decision of the lowering of the servo signal is made stricter in order to better the positioning precision, the re-magnetizations are frequently performed with the technique disclosed in Japanese Laid-Open Patent Publication No. 2006-66006. This can cause the problems that the re-magnetization is required during the use of the disk apparatus by a user, and that a re-magnetization process becomes long to increase power consumption.

SUMMARY

According to an aspect of an embodiment of the present invention, a storage apparatus includes a magnetic storage medium which is formed with a data portion based on isolated magnetic dots and a servo pattern portion, a drive mechanism which drives the storage medium, a head actuator which includes a head for reading and writing data from and to the storage medium, and a permanent magnet which is disposed at a position that is opposable to a whole radial region of the servo pattern portion, during a rotation of the storage medium.

The object and advantage of the invention will be realized and attained by means of the elements and combinations particularly pointed out in the claims.

It is to be understood that both foregoing general descriptions and the following detailed description are exemplary and explanatory and are not restrictive of invention, as claimed.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF EMBODIMENTS

Figure 1:
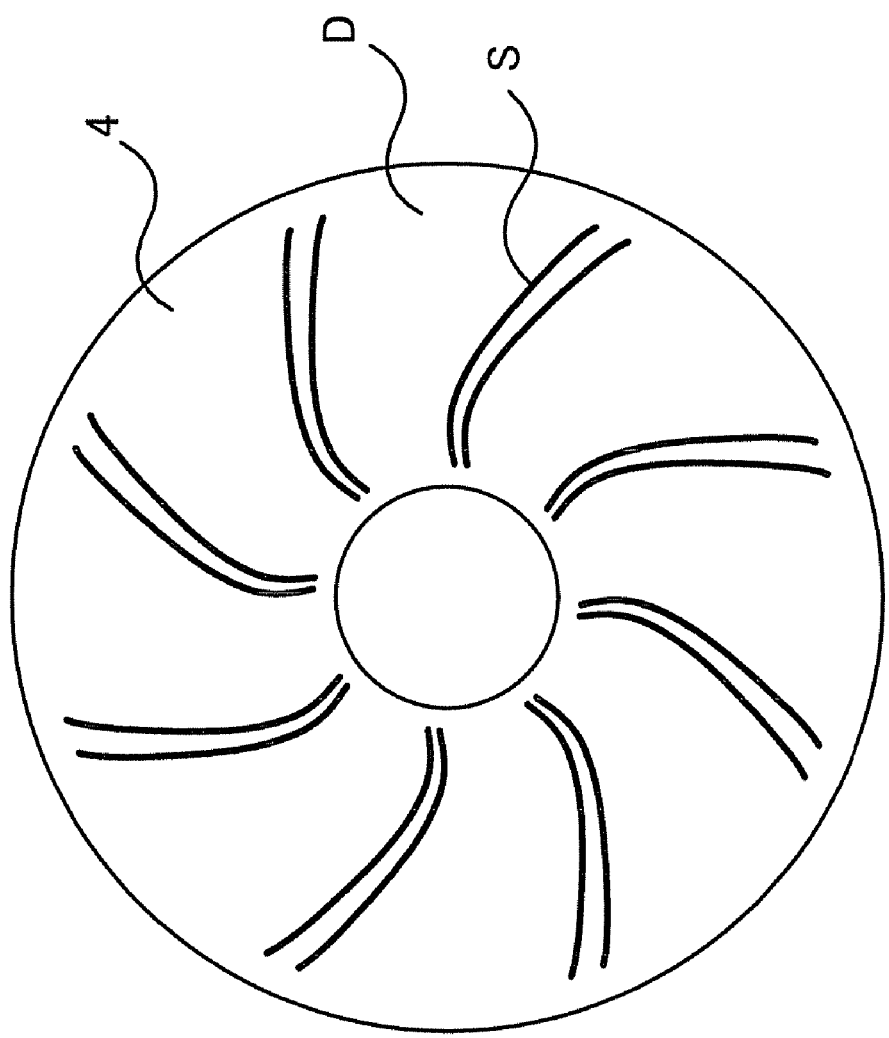
FIG. 1 is a plain view of a magnetic storage medium (magnetic disk) for perpendicular recording as has a structure in which recording tracks are divided by grooves or nonmagnetic regions.

Reference will now be made in detail to the embodiments, examples of which are illustrated in the accompanying drawings, wherein like reference numerals refer to the like elements throughout. The embodiments are described below to explain the present invention by referring to the figures.

The aspects of performance of a storage apparatus according to the embodiments will be described below in detail in conjunction with concrete embodiments with reference to the accompanying drawings. Before the description, a configuration of a perpendicular magnetic recording disk which is formed with data portions based on isolated magnetic dots, and servo pattern portions will be explained with reference to FIGS. 1 to 3.

FIG. 1 shows the perpendicular magnetic recording disk 4 (hereinafter, simply termed the "magnetic disk" or "disk" in some cases) being a magnetic storage medium for perpendicular recording as has a structure in which recording tracks are divided by grooves or nonmagnetic regions. The magnetic disk 4 includes data portions D in which data are recorded, and servo pattern portions S in which servo data that contain track data and sector data are recorded. FIG. 1 indicates the positions of the data portions D and the servo pattern portions S on the magnetic disk 4.

Figure 2:
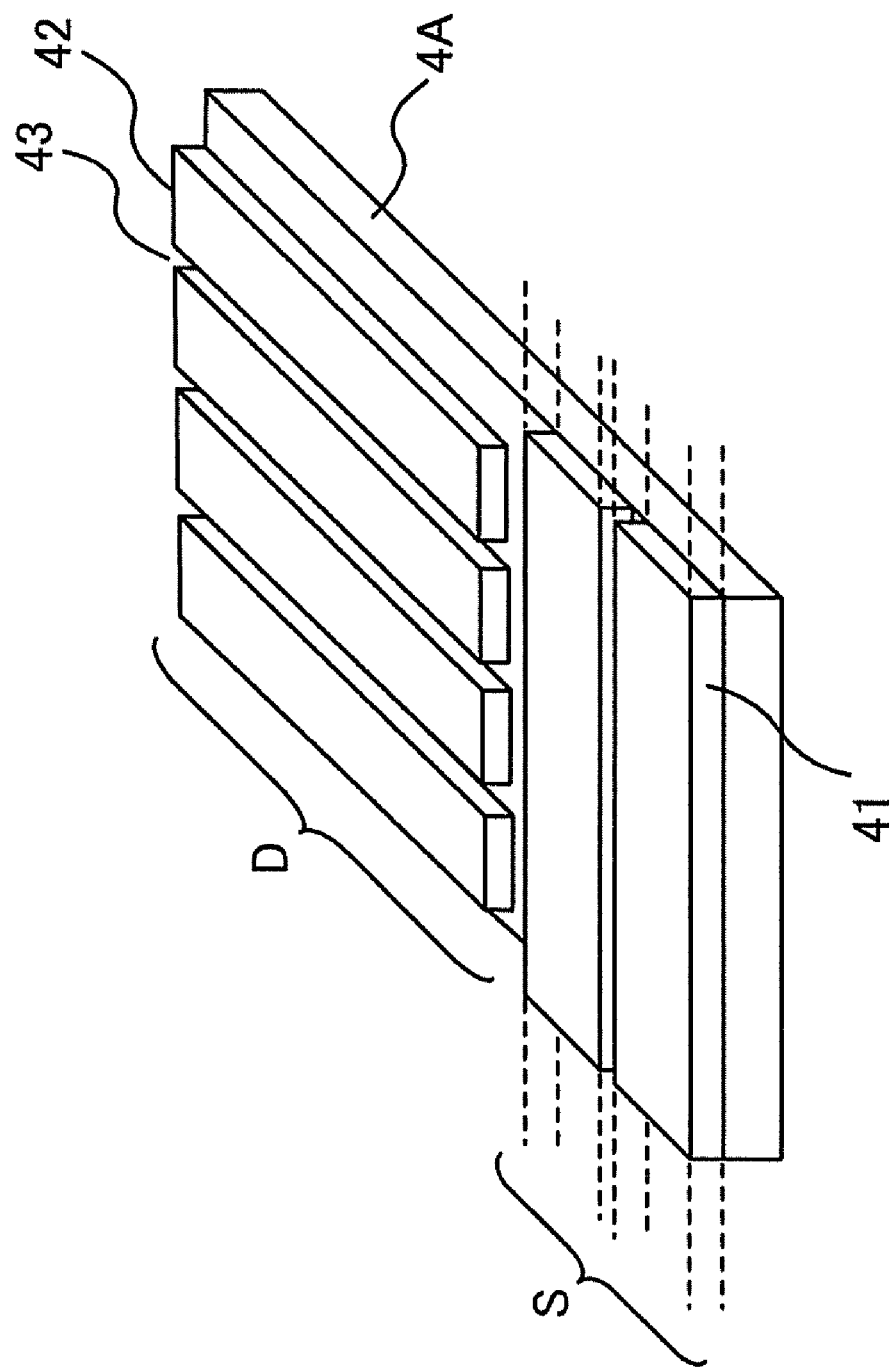
FIG. 2 is a partial enlarged perspective view of a discrete track medium (DTM) which includes a servo pattern portion, and a data portion where regions of nonmagnetic portions are formed between recording tracks.

FIG. 2 shows a discrete track medium (DTM) 4A which includes a servo pattern portion S, and a data portion D where regions (grooves) 43 of nonmagnetic portions are formed between recording tracks 42. A magnetic material pattern for servo signals 41 is magnetized either upwards (toward the front surface of the DTM 4A) or downwards. In addition, data are perpendicularly recorded into the tracks 42 by a magnetic head not shown.

Figure 3:
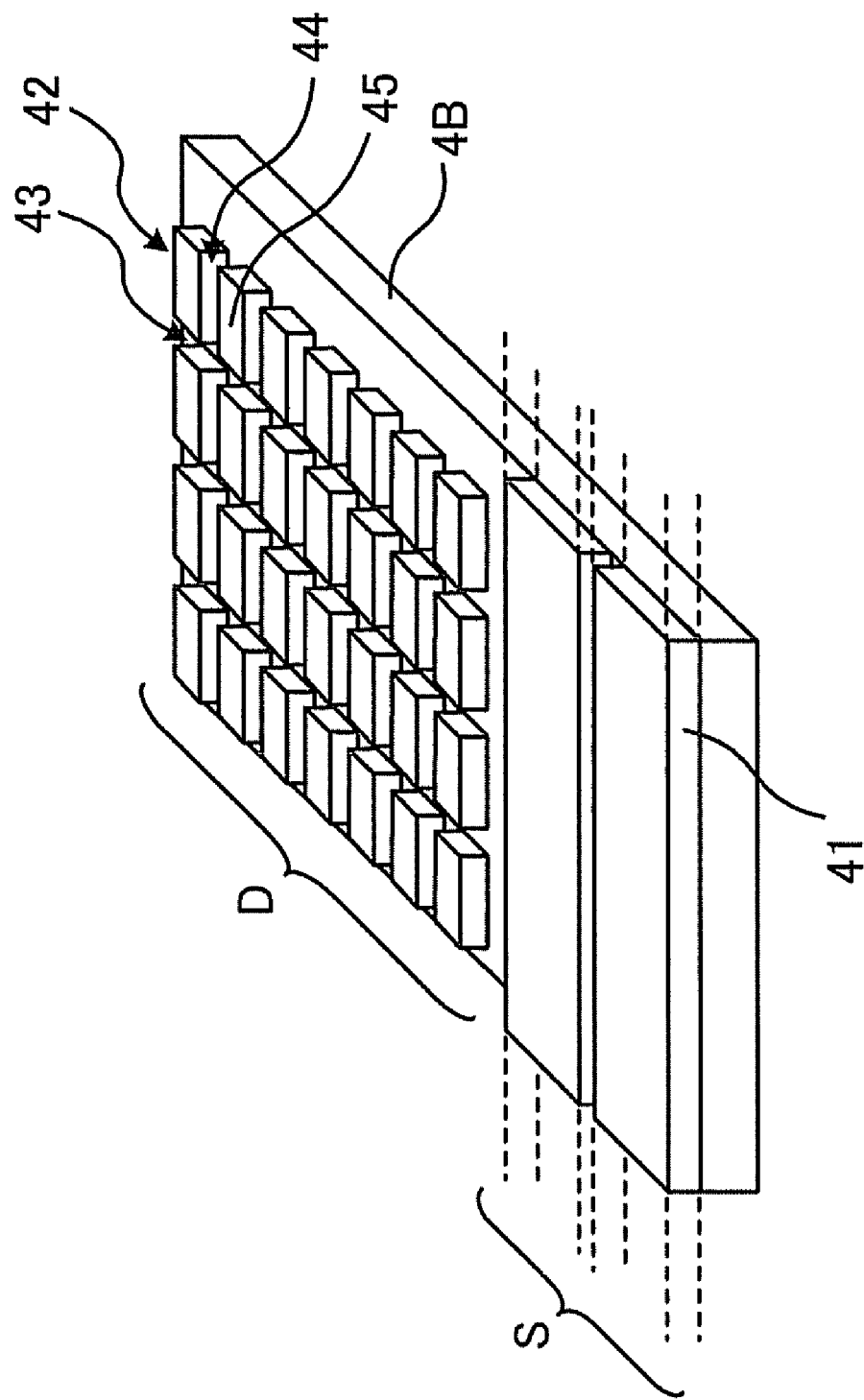
FIG. 3 is a partial enlarged perspective view of a bit patterned medium (BPM) which includes a servo pattern portion, and a data portion where regions of nonmagnetic portions are formed between recording tracks, and the recording tracks are divided by nonmagnetic portions, whereby isolated magnetic dots are formed on a disk medium in a direction of each track.

FIG. 3 shows a bit patterned medium (BPM) 4B into which the DTM 4A has been further expanded. Like the DTM 4A in FIG. 2, the BPM 4B is provided with a servo pattern portion S and a data portion D. The servo pattern portion S of the BPM 4B has the same configuration as in the DTM 4A, and it includes a magnetic material pattern for servo signals 41. The data portion D of the BPM 4B has a configuration different from that of the DTM 4A. In the data portion D of the BPM 4B, after grooves 43 have been formed between recording tracks 42, the recording tracks 42 are divided by nonmagnetic portions 44, whereby isolated magnetic dots 45 are formed on the disk medium in the direction of each track. In addition, using the magnetic dots 45 as information units (bits), data are perpendicularly recorded by a magnetic head not shown.

Figure 4:
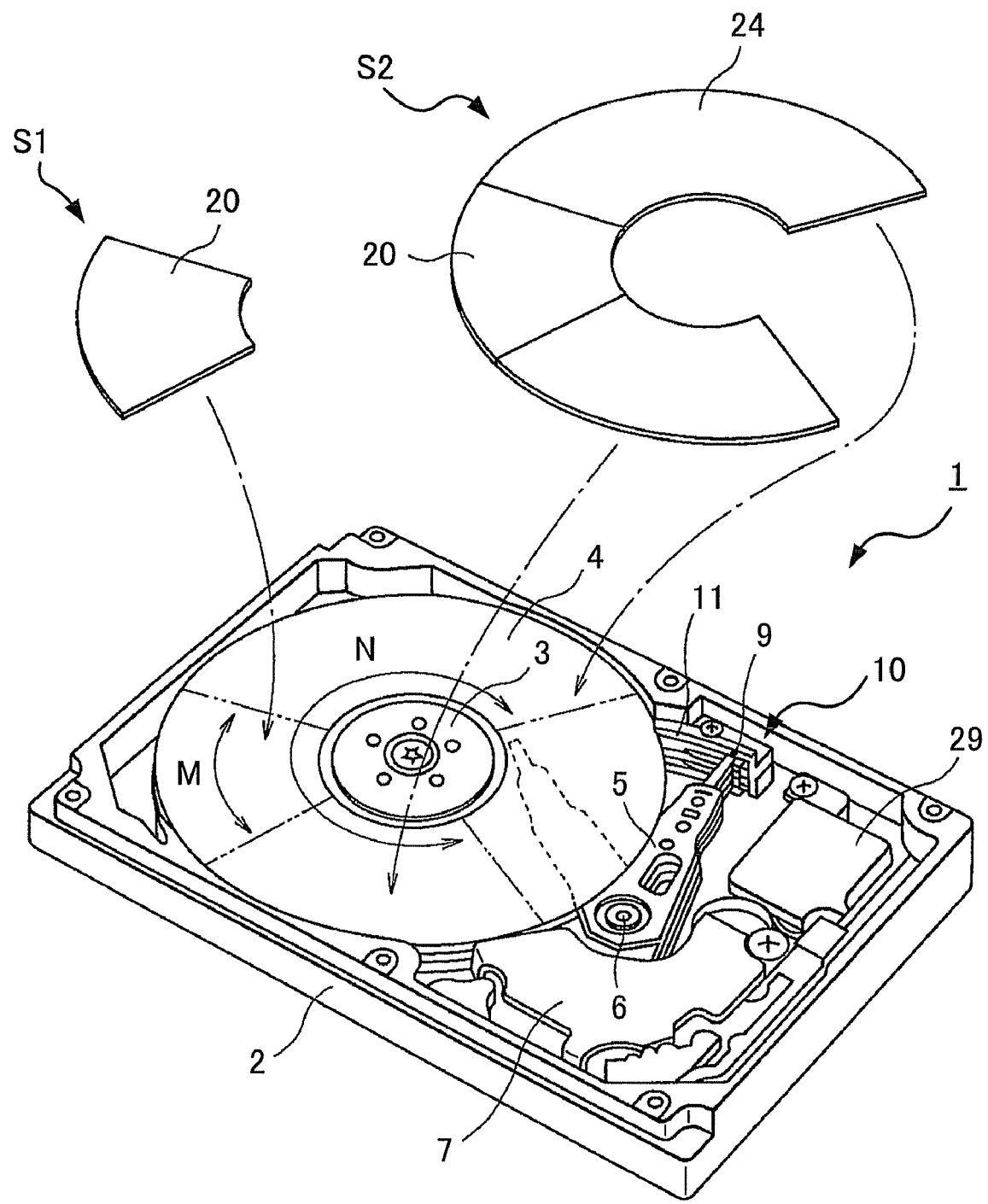
FIG. 4 is a perspective view of a magnetic disk apparatus showing embodiments of a magnetic disk apparatus.

FIG. 4 shows a configuration of an example of a hard disk drive 1 having a load/unload scheme as in a storage apparatus which uses the magnetic disk 4 formed with the data portion D and the servo pattern portion S as shown in FIG. 2 or FIG. 3. A plurality of magnetic disks 4 are sometimes disposed, and the magnetic disk 4 is rotated by a spindle motor 3 which is disposed on one side of the base 2 of the hard disk drive 1.

On the other side of the base 2 of the hard disk drive 1, there is a swing arm 5 to which a head slider including a head that accesses the track of the disk 4 and that reads or writes data is attached. The head slider is attached to a distal end part of the swing arm 5. The swing arm 5 is configured so as to swing between a position indicated by solid lines and a position indicated by a broken line, about a rotational arbor 6. A voice coil motor 7 for driving the swing arm 5 is disposed on an opposite side of the swing arm 5 with respect to the rotational arbor 6. Numeral 29 designates a circuit for driving the head.

Besides, in the hard disk drive 1 of the load/unload scheme, the head is retracted outside the disk 4 in an unload mode. For this purpose, in the hard disk drive 1 of the load/unload scheme, a lump mechanism 10 for holding the distal end part of the swing arm 5 is provided on the base 2 near an outer peripheral part of the disk 4. The lump mechanism 10 includes a lump 11 for holding a lift tab 9 which is provided at the distal end part of the swing arm 5. Although the lump mechanism 10 is provided outside the disk 4, the lump 11 partly overlaps the magnetic disk 4.

In case of, for example, the BPM 4B worked into patterns, the area (volume) of each magnetic material pattern 41 of the servo pattern portion S affording the servo signals is larger than the area (volume) of each magnetic dot 45 which serves as the information unit and which is arranged in the data portion D. Consequently, the coercive forces of the magnetic material patterns 41 of the servo pattern portion S become smaller than those of the magnetic dots 45 of the data portion D on account of shape anisotropies and magnetostatic interactions from the surroundings. This indicates that the magnetizations of the magnetic material patterns 41 of the servo pattern portion S are less stable than those of the magnetic dots 45 of the data portion D.

In this invention, therefore, a servo signal stabilizing plate by which the magnetized states of the magnetic material patterns 41 of the servo pattern portion S can be held stable is disposed in opposition to the magnetic disk 4. FIG. 4 illustrates the servo signal stabilizing plate S1 of an embodiment, and the servo signal stabilizing plate S2 of another embodiment. Both the servo signal stabilizing plate S1 and the servo signal stabilizing plate S2 are shaped so as to form parts of doughnut disks which are about 1 mm thick. Meaning, the servo signal stabilizing plates S1 and S2 are formed relative to a shape of a disk.

Figure 5A:
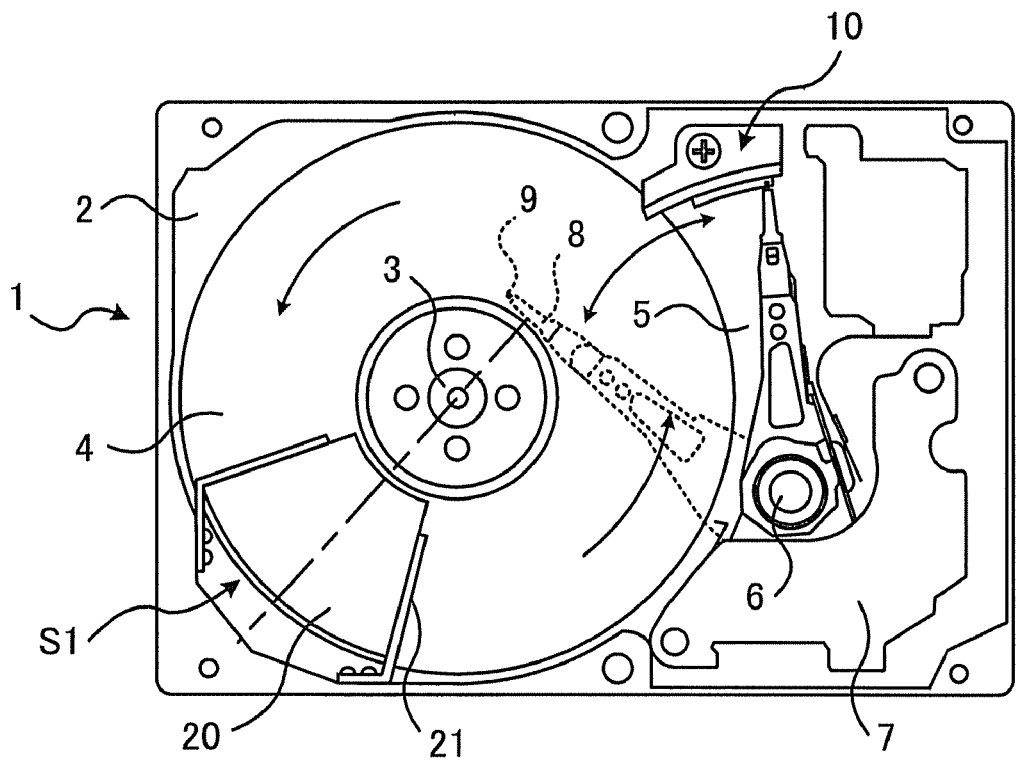
FIG. 5A is a plain view showing a state where a servo signal stabilizing plate is mounted on a position opposing to a predetermined region of a magnetic disk.

The servo signal stabilizing plate S1 is configured of a flat permanent magnet 20. The servo signal stabilizing plate S1 can be mounted on a position opposing the region M of the magnetic disk 4 by, for example, an arm-like bracket 21 shown in FIG. 5A. The length of the permanent magnet 20 in the radial direction of the magnetic disk 4 is a length which covers all of the magnetic disk 4 from the inner peripheral part thereof where the servo pattern portion S exists, to the outer peripheral part thereof. The length of the permanent magnet 20 in the circumferential direction thereof is not especially stipulated. In addition, the permanent magnet 20 is magnetized upwards or downwards in a direction perpendicular to the plane of the magnetic disk 4. The direction of the magnetization of the permanent magnet 20 is the same as that of the magnetization of each magnetic material pattern 41 of the servo pattern portion S. Besides, that region M of the magnetic disk 4 on which the permanent magnet 20 is mounted is the remotest region from a position at which the head 8 has come to the innermost peripheral part of the magnetic disk 4, in order that no influence may be exerted on the operation of the head 8 carried on the distal end part of the turnable swing arm 5.

Figure 6A:
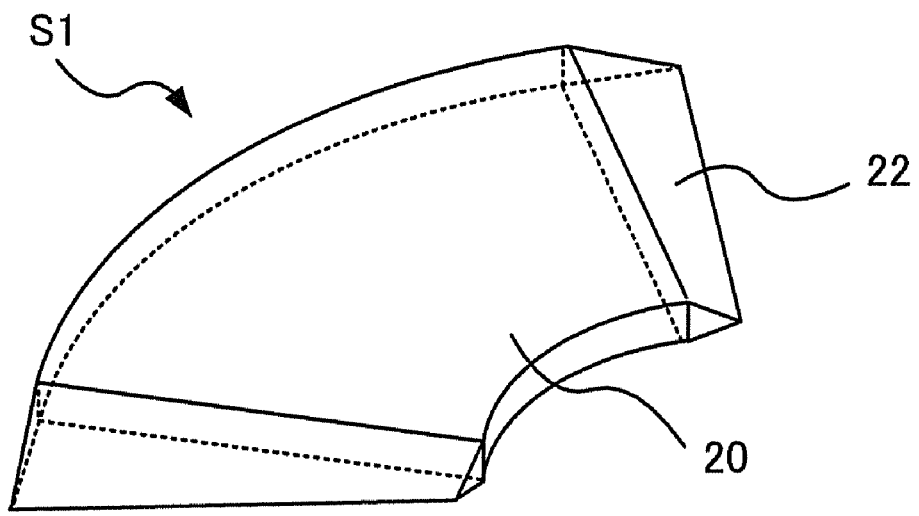
FIG. 6A is a perspective view showing a configuration of an embodiment of a permanent magnet shown in FIG. 4.
Figure 6B:
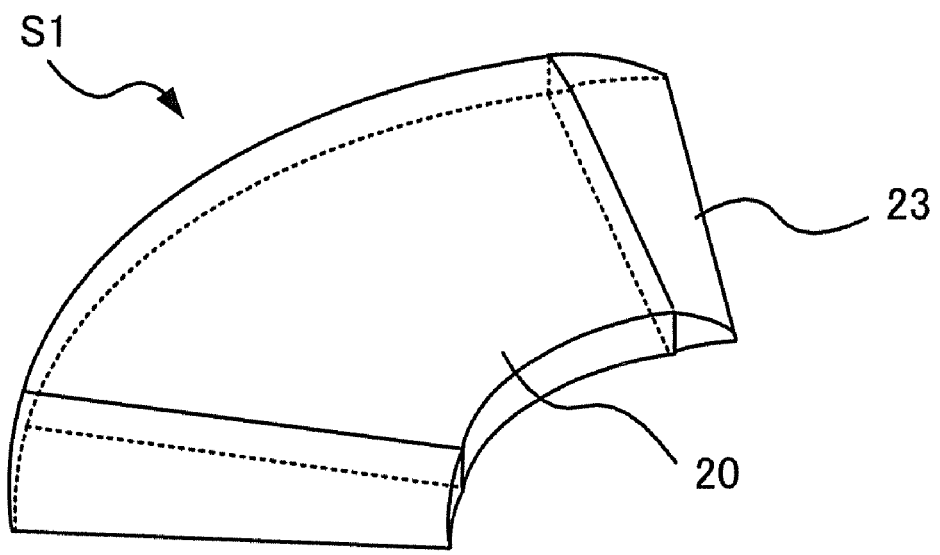
FIG. 6B is a perspective view showing a configuration of still an embodiment of a permanent magnet shown in FIG. 4.

In addition, the servo signal stabilizing plate S1 can be implemented in an embodiment in which, as shown in FIG. 6A or 6B, rectification members 22 or 23 are mounted on both the sides of the permanent magnet 20 so that an air current flowing over the magnetic disk 4 may be prevented from being disturbed. Each of the rectification members 22 is such that both vertical surfaces thereof are tapered. On the other hand, each of the rectification members 23 is such that a bottom surface thereof is even with the bottom surface of the permanent magnet 20, and that an upper surface thereof is a tapered surface.

Figure 5B:
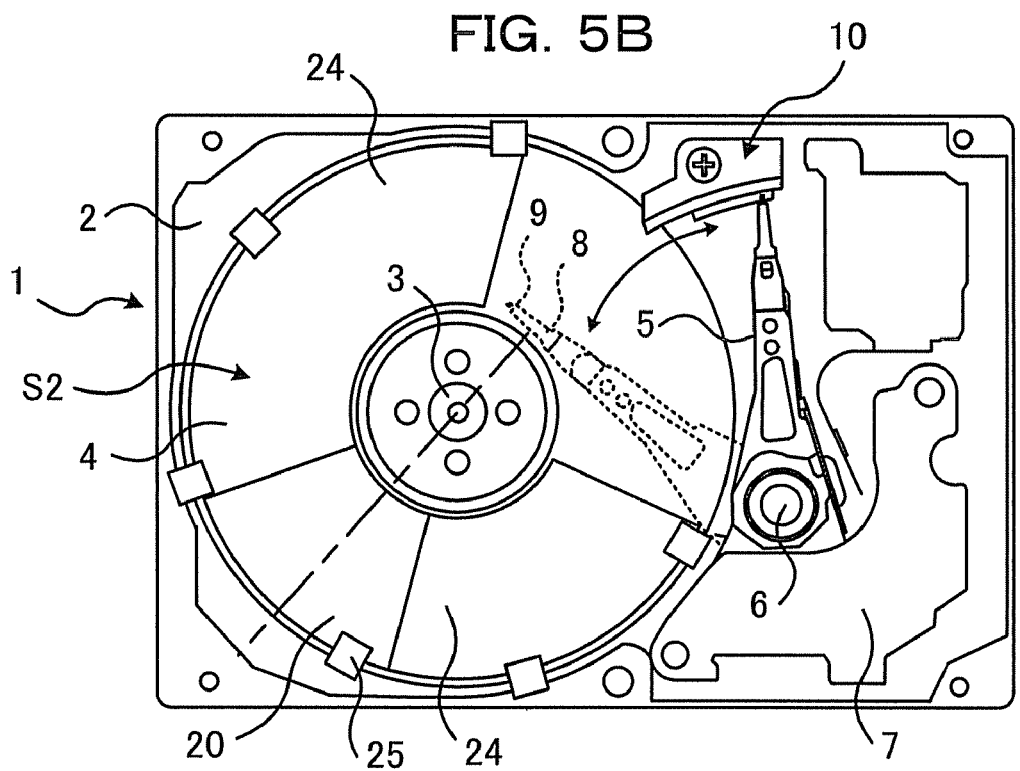
FIG. 5B is a plain view showing a state where a servo signal stabilizing plate is mounted on a position opposing to a predetermined region of a magnetic disk.

The servo signal stabilizing plate S2 is configured such that a flat permanent magnet 20 is mounted on a part of an air current stabilizing plate 24. The servo signal stabilizing plate S2 has a shape in which a region where the swing arm 5 carrying the head 8 turns is removed from the shape of the doughnut disk. In addition, the servo signal stabilizing plate S2 can be mounted on a position opposing the region N of the magnetic disk 4 by, for example, a plurality of fixtures 25 shown in FIG. 5B. The size of the permanent magnet 20 here may be the same as the size of the permanent magnet 20 in the servo signal stabilizing plate S1 according to an embodiment. Besides, the direction of the magnetization of the permanent magnet 20 is the same as that of the magnetization of each magnetic material pattern 41 of the servo pattern portion S, that is, the permanent magnet 20 is magnetized upwards or downwards in the direction perpendicular to the plane of the magnetic disk 4. Further, in a state where the servo signal stabilizing plate S2 is attached to the hard disk drive 1, the permanent magnet 20 opposes to the region M of the magnetic disk 4.

Figure 7A:
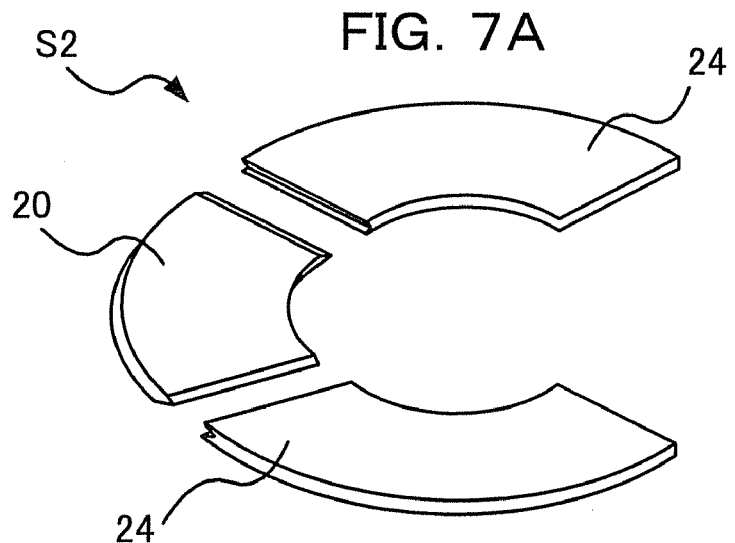
FIG. 7A is an assemblage perspective view showing a configuration of a servo signal stabilizing plate in another embodiment.

Besides, the servo signal stabilizing plate S2 as shown in FIG. 4 is such that, as shown in FIG. 7A, the air current stabilizing plates 24 are respectively joined to both sides of the permanent magnet 20 in a circumferential direction thereof. Here, the thicknesses of the permanent magnet 20 and each air current stabilizing plate 24 are the same. In an embodiment, in order to attain a good bondability, both the sides of the permanent magnet 20 in the circumferential direction thereof are tapered, and V-shaped grooves are formed in the joint surfaces of the air current stabilizing plates 24.

Figure 7B:
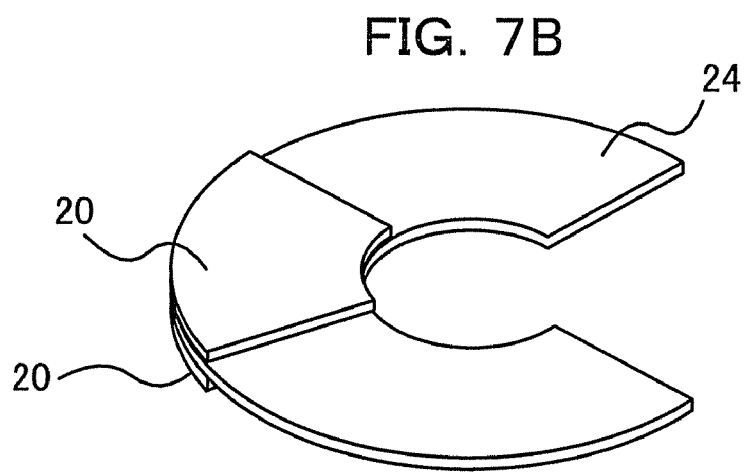
FIG. 7B is a perspective view showing another configuration of a servo signal stabilizing plate as shown in FIG. 4.
Figure 7C:
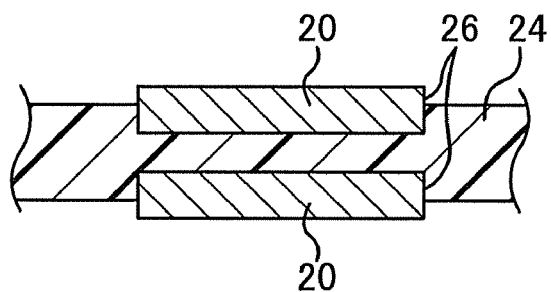
FIG. 7C is a partial enlarged sectional view showing still another configuration of a servo signal stabilizing plate.
Figure 7D:
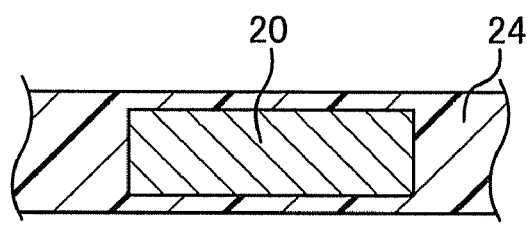
FIG. 7D is a partial enlarged sectional view showing yet another configuration of a servo signal stabilizing plate.

FIG. 7B shows an embodiment of the servo signal stabilizing plate S2. The servo signal stabilizing plate S2 of an embodiment is so configured that permanent magnets 20 are stuck on both the surfaces of one air current stabilizing plate 24 which is thin. As the servo signal stabilizing plate S2, apart from the configurations of the above embodiments, it is possible to employ a configuration in which, as shown in FIG. 7C, recesses 26 are provided in both surfaces of one air current stabilizing plate 24, and permanent magnets 20 are respectively fitted into the recesses 26, and a configuration in which, as shown in FIG. 7D, a permanent magnet 20 is buried into an air current stabilizing plate 24 by insert-molding.

Figure 8A:
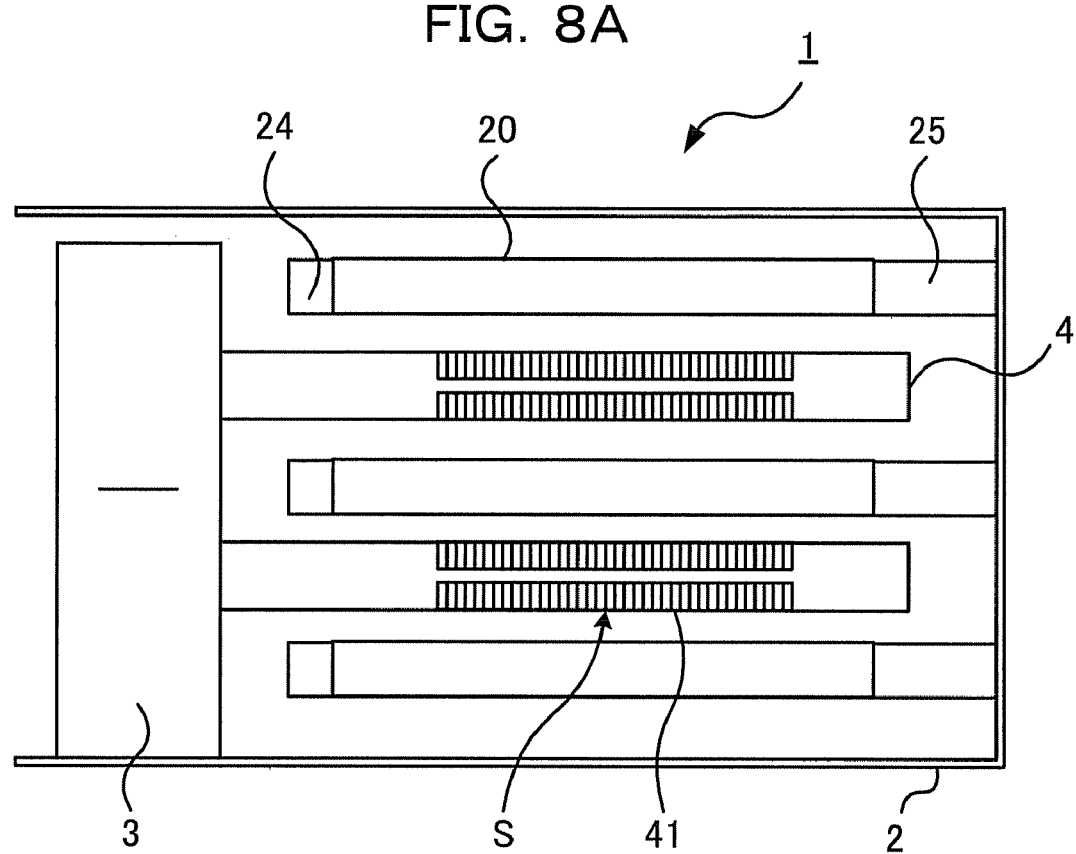
FIG. 8A is a sectional view showing portion(s) of a storage apparatus in an enlarged scale.

FIG. 8A shows sections of the hard disk drive 1 configured as described above. In the hard disk drive 1 of this example, the two magnetic disks 4 are mounted on the spindle motor 3. In case of this configuration, the permanent magnets 20 are secured to an inwall of the base 2 by the fixtures 25 so as to hold each of the two magnetic disks 4 between two of these permanent magnets 20 from both the sides thereof. As stated before, the length of the permanent magnet 20 in the radial direction of the magnetic disk 4 is the length which entirely covers the inner peripheral part of the magnetic disk 4 to the outer peripheral part thereof where the servo pattern portion S exists. In addition, the permanent magnets 20 are magnetized upwards or downwards in a direction perpendicular to the planes of the magnetic disks 4. The directions of the magnetizations of the permanent magnets 20 are the same as those of the magnetizations of the magnetic material patterns 41 of the servo pattern portions S, thereby to maintain the magnetizations of the magnetic material patterns 41 which exist in the servo pattern portions S. This will be explained with reference to FIG. 8B.

Figure 8B:
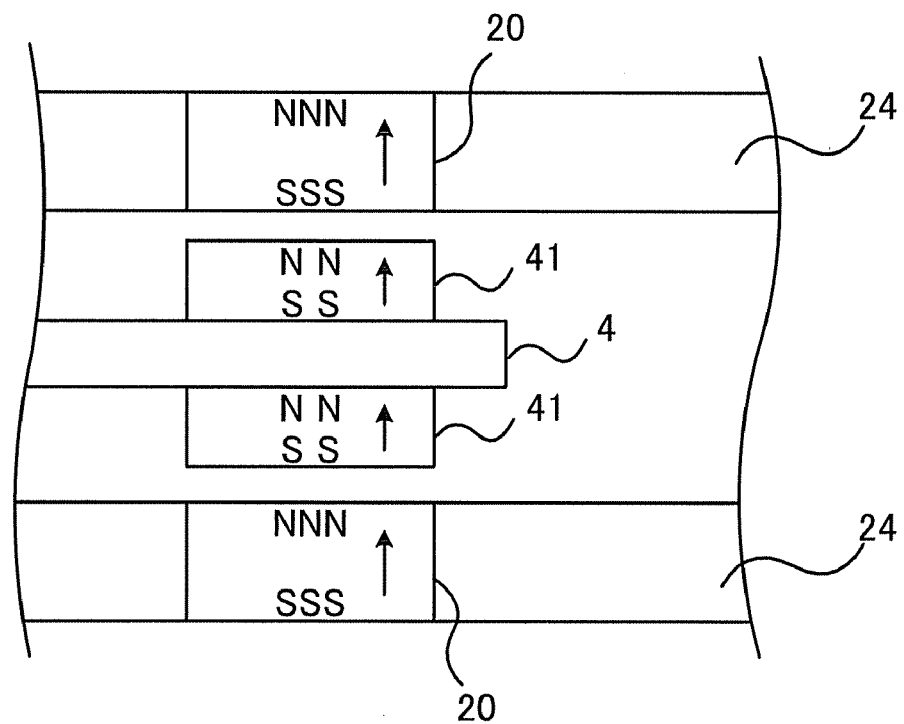
FIG. 8B is an explanatory view for explaining operation(s) of permanent magnets in FIG. 8A.

FIG. 8B schematically shows a part of FIG. 8A on an enlarged scale. Regarding the directions of the magnetizations of the magnetic material patterns 41 of the servo pattern portion S, it is assumed that the magnetic material pattern 41 on the upper surface of the magnetic disk 4 is magnetized upwards relative to the magnetic disk surface (with S-poles held on the disk side of the magnetic material pattern 41). Besides, it is assumed that the magnetic material pattern 41 on the lower surface of the magnetic disk 4 is magnetized downwards relative to the magnetic disk surface (upwards as viewed from the hard disk drive, and with N-poles held on the disk side of the magnetic material pattern 41).

In this case, the directions of the magnetizations of the two permanent magnets holding the magnetic disk 4 therebetween are the same as those of the magnetizations of the magnetic material patterns 41 located on the magnetic disk 4, and they are upward (as viewed from the hard disk drive, the directions of the magnetizations are upward). That is, the directions of the magnetizations of the lower one 20 to the upper one 20 of the permanent magnets holding the magnetic disk 4 therebetween are the same.

As stated before, in the case of a storage medium worked (divided) into the patterns, the area (volume) of each magnetic material pattern 41 of the servo pattern portion S affording the servo signals is larger than the area (volume) of each magnetic dot 45 in the data portion D. Consequently, a coercive force of the magnetic material pattern 41 of the servo pattern portion S becomes smaller than that of the magnetic dot 45 of the data portion D on account of the shape anisotropy and the magnetostatic interactions from the surroundings.

Using the difference of the coercive forces, therefore, a magnetic field intensity which is generated by the permanent magnet 20 for stabilizing the servo signal is moderated to the extent that the influence of inverting the direction of the magnetization of the magnetic dot 45 of the data portion D is not exerted. Thus, a magnetic field generated by the permanent magnet 20 for stabilizing the servo signal is promoted to keep unidirectional the direction of the magnetization of the magnetic material pattern 41 of the servo pattern portion S. As a result, each time the magnetic material pattern 41 of the servo pattern portion S rotates to pass within the magnetic field generated by the permanent magnet 20, the stability of the magnetization can be heightened.

In more detail, the magnetic dot 45 of the data portion D has value(s) of, for example, a coercive force of 5000 [Oe] and a magnetization reversal initiation magnetic field of 3000 [Oe]. The arrangement and shape of the permanent magnet 20 are determined so that the intensity of the permanent magnet 20 for stabilizing the servo signal may become a value which is smaller than the magnetization reversal initiation magnetic field of the dot 45, at the position of the magnetic dot 45 of the data portion D. The magnetic field intensity at the position of the magnetic dot 45 of the data portion D becomes smaller in such a way that the size of the permanent magnet 20 is made smaller, or that the distance between the magnetic dot 45 of the data portion D and the permanent magnet 20 is made longer. A neodymium magnet or a samarium-cobalt magnet is employed as the sort of the permanent magnet 20.

The embodiment described above is a preferred exemplary embodiment. The present invention is not limited to this but various modifications can be made without departing from the spirit of the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been shown and described in detail, it should be understood that the various changes, substitutions, and alterations could be made hereto without departing from the spirit and scope of the invention, the scope of which is defined in the claims and their equivalents.

What is claimed is:

1. A storage apparatus, comprising:
   a magnetic storage medium which is formed with a data portion based on isolated magnetic dots and a servo pattern portion;
   a drive mechanism which drives said storage medium;
   a head actuator which includes a head for reading and writing data from and to said storage medium; and
   a permanent magnet which is disposed at a position that is opposable to a whole radial region of the servo pattern portion, during a rotation of said storage medium.

2. The storage apparatus as defined in claim 1, wherein said permanent magnet is fixed to a housing of said storage apparatus in a region outside an operating range of said head actuator.

3. The storage apparatus as defined in claim 1, wherein an air current stabilizing plate which stabilizes an air current flowing over a surface of said storage medium is fixed to a housing of said storage apparatus in a region outside an operating range of said head actuator, and the air current stabilizing plate is disposed in opposition to said storage medium; and
   said permanent magnet is mounted on a part of said air current stabilizing plate.

4. The storage apparatus as defined in claim 3, wherein air current stabilizing plates are unitarily attached to both sides of said permanent magnet.

5. The storage apparatus as defined in claim 3, wherein said permanent magnet is disposed in a state where said permanent magnet is stuck on a front surface of said air current stabilizing plate.

6. The storage apparatus as defined in claim 5, wherein permanent magnets are disposed in a state where said permanent magnets are stuck on both surfaces of said air current stabilizing plate.

7. The storage apparatus as defined in claim 3, wherein said permanent magnet is disposed in a state where said permanent magnet is buried in said air current stabilizing plate.

8. The storage apparatus as defined in claim 3, wherein said permanent magnet is disposed in a state where said permanent magnet is fitted in a recess which is provided in a front surface of said air current stabilizing plate.

9. The storage apparatus as defined in claim 3, wherein said air current stabilizing plate is disposed in a state where an end part thereof is fixed to a wall member which is protruded on a bottom surface of the housing.

10. The storage apparatus as defined in any of claims 1, wherein said permanent magnet is disposed in a vicinity of a position whose distance from the head is the largest.

11. The storage apparatus as defined in any of claims 1, wherein permanent magnets are disposed on both surfaces of said storage medium, and directions of magnetizations of said permanent magnets are identical to a direction of a magnetization of said servo pattern portion.

12. A storage apparatus as defined in any of claims 11, wherein an intensity of said permanent magnet is a value smaller than a magnetization inversion initiation magnetic field of each magnetic dot, at a position of the magnetic dot in the data portion.

13. The storage apparatus as defined in claim 12, wherein a coercive force of said permanent magnet is less than 3000 Oe.

14. The storage apparatus as defined in claim 1, wherein said permanent magnet is formed in a tapered shape so that an end part of said permanent magnet does not disturb a flow of an air current which flows over a surface of said storage medium.

15. A storage apparatus as defined in any of claims 1, wherein said storage medium is a bit patterned medium (BPM) in which regions of nonmagnetic parts are formed between recording tracks, in a data portion, and in which the recording tracks are divided by nonmagnetic parts, thereby forming the isolated magnetic dots in a track direction on the disk medium.

16. A storage apparatus as defined in any of claims 1, wherein said storage medium is a discrete track medium (DTM) in which regions of nonmagnetic parts are formed between recording tracks, in a data portion.

17. The storage apparatus as defined in claim 1, wherein said permanent magnet is a neodymium magnet or a samarium-cobalt magnet.

* * * * *

UNITED STATES PATENT AND TRADEMARK OFFICE
CERTIFICATE OF CORRECTION

| | | |
|---|---|---|
| PATENT NO. | : 8,064,155 B2 | |
| APPLICATION NO. | : 12/407394 | |
| DATED | : November 22, 2011 | |
| INVENTOR(S) | : Hironori Teguri et al. | |

It is certified that error appears in the above-identified patent and that said Letters Patent is hereby corrected as shown below:

Column 8, Line 16, In Claim 10, delete "any of claims" and insert -- claim --, therefor.

Column 8, Line 19, In Claim 11, delete "any of claims" and insert -- claim --, therefor.

Column 8, Line 24, In Claim 12, delete "any of claims" and insert -- claim --, therefor.

Column 8, Line 36, In Claim 15, delete "any of claims" and insert -- claim --, therefor.

Column 8, Line 43, In Claim 16, delete "any of claims" and insert -- claim --, therefor.

Signed and Sealed this
Seventh Day of February, 2012

David J. Kappos
*Director of the United States Patent and Trademark Office*